(12) United States Patent
Le Gros et al.

(10) Patent No.: US 10,502,870 B2
(45) Date of Patent: Dec. 10, 2019

(54) OPTICAL ASSEMBLY

(71) Applicant: North Inc., Ontario (CA)

(72) Inventors: Christophe Le Gros, Renens (CH);
Jonathan Masson, Pully (CH); **Lucio
Kilcher**, Montreux (CH)

(73) Assignee: North Inc., Kitchener, ON (CA)

( * ) Notice: Subject to any disclaimer, the term of this
patent is extended or adjusted under 35
U.S.C. 154(b) by 64 days.

(21) Appl. No.: 14/433,589

(22) PCT Filed: Oct. 2, 2013

(86) PCT No.: PCT/EP2013/070574
§ 371 (c)(1),
(2) Date: Apr. 3, 2015

(87) PCT Pub. No.: WO2014/053562
PCT Pub. Date: Apr. 10, 2014

(65) Prior Publication Data
US 2015/0253469 A1 Sep. 10, 2015

Related U.S. Application Data

(60) Provisional application No. 61/709,508, filed on Oct. 4, 2012.

(51) Int. Cl.
| G02B 3/00 | (2006.01) |
| G02B 13/22 | (2006.01) |
| G02B 5/02 | (2006.01) |
| G02B 5/10 | (2006.01) |
| G02B 27/01 | (2006.01) |

(52) U.S. Cl.
CPC .......... G02B 3/005 (2013.01); G02B 3/0006
(2013.01); G02B 3/0056 (2013.01); **G02B
5/0215 (2013.01); G02B 13/22** (2013.01);
G02B 5/10 (2013.01); G02B 27/0101
(2013.01); G02B 2027/0118 (2013.01)

(58) Field of Classification Search
CPC .............................. G02B 3/005; G02B 13/22
USPC ........................................................ 359/619
See application file for complete search history.

(56) References Cited

U.S. PATENT DOCUMENTS

| 6,399,942 B1 | 6/2002 | Ishihara |
| 2009/0067057 A1 | 3/2009 | Sprague |

FOREIGN PATENT DOCUMENTS

| EP | 0785411 A1 | 7/1997 |
| EP | 1729172 A1 | 12/2006 |
| EP | 2048536 A2 | 4/2009 |
| WO | 2005078511 A1 | 8/2005 |
| WO | 2005103795 A1 | 11/2005 |
| WO | 2006072263 A1 | 7/2006 |

OTHER PUBLICATIONS

International Search Report, dated Feb. 7, 2014, Application No. PCT/EP2013/070574, Filed Date: Oct. 2, 2013, pp. 6.

*Primary Examiner* — Jack Dinh
(74) *Attorney, Agent, or Firm* — Thomas Mahon

(57) ABSTRACT

An optical assembly, and in particular an optical assembly which uses a microlens array or a micromirror array to reduce speckle. It further concerns an optical component which comprises a micromirror array.

6 Claims, 16 Drawing Sheets

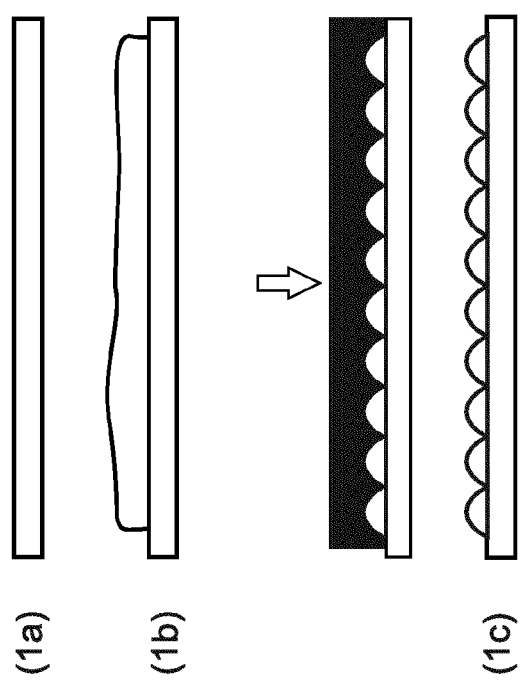

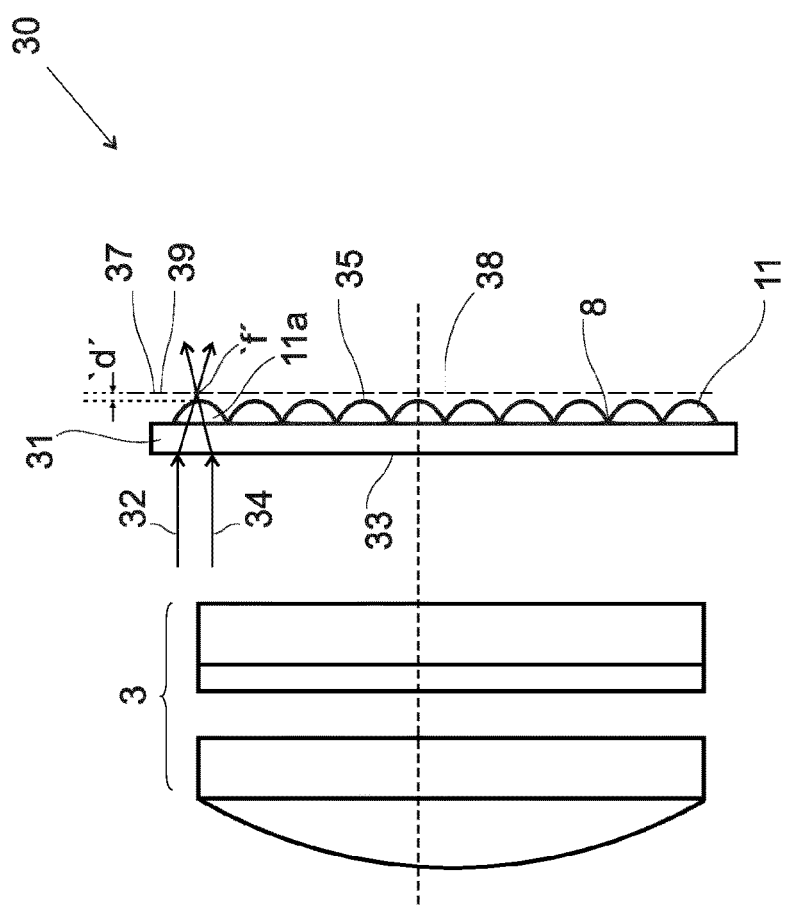

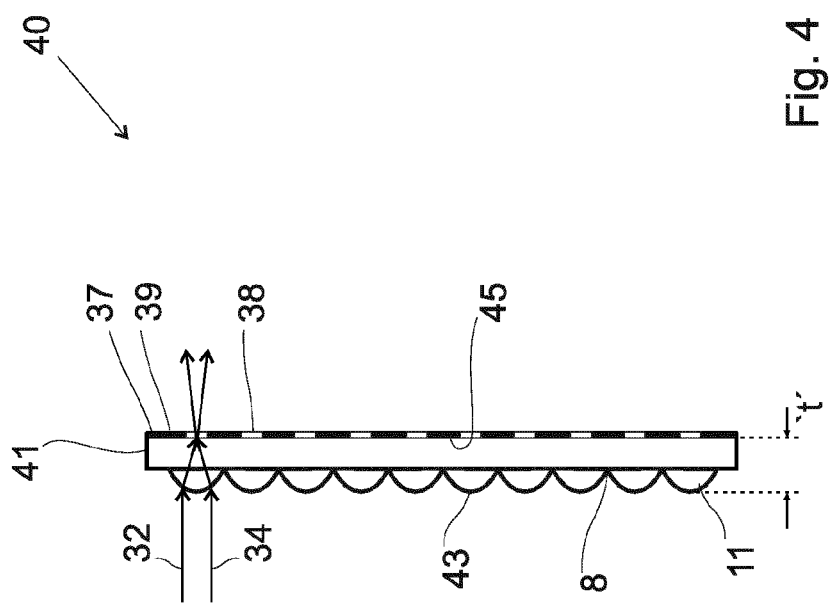

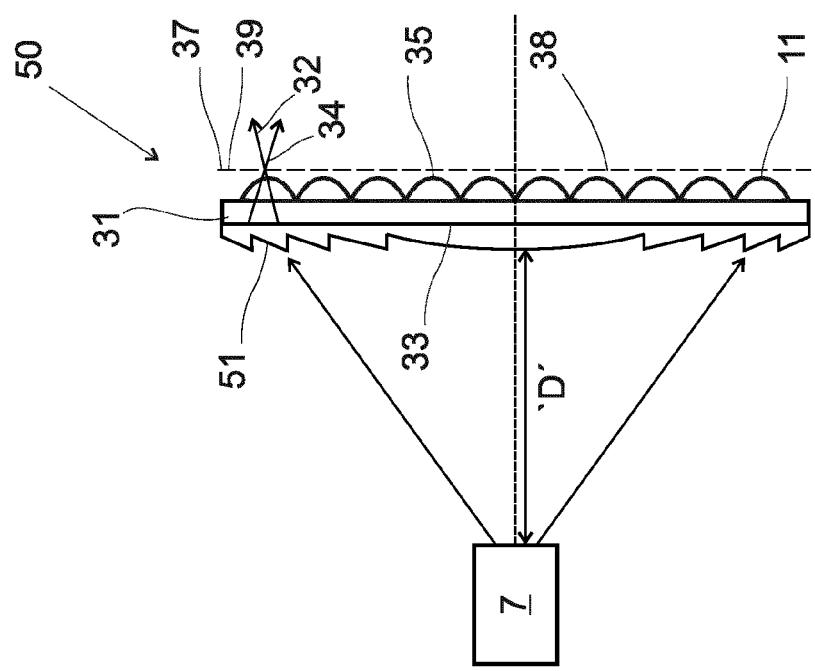

OPTICAL ASSEMBLY

FIELD OF THE INVENTION

The present invention concerns an optical assembly, and in particular an optical assembly which comprises a microlens array or a micromirror array. It further concerns an optical component which comprises a micromirror array.

DESCRIPTION OF RELATED ART

Many projection systems in use today feature light diffusers. The light diffusers are used to diffuse light beams which they received. The diffusion of light beams in a projection system is done so as to create a field of view i.e. a region wherein the projected image can be seen by a viewer. A field of view enables a user to move within the field of view and to still see the image; without a field of view created by the diffuser a user could only see the projected image when they are located at a single location. Diffusers are therefore used in projection systems to provide and define a field of view.

Diffusers are used, for example in HUD (Head-up-displays) so as to enable a virtually projected image (i.e. image which appears, virtually, to the viewer to be projected to a location in the distance) to be viewed by a viewer from different locations i.e. from any location within the field of view defined by the diffuser. More specifically the diffusers enable light scattering from each pixel of the image, in all directions, within the field of view. Thus, the eye of the viewer receives light from all the pixels of the image, when the viewer is located in the field of view, so that the viewer can see the full projected image.

Disadvantageously when light signals are passed though a diffuser, the diffuser randomises the phase of the coherent light; thus the coherent light which is emitted from the diffuser will have random phases; the random phase of the light induces a speckle effect. The induced speckle effect will reduce the resolution and overall quality of the projected image.

It is an aim of the present invention to mitigate, or obviate, at least some of the above-mentioned disadvantages.

BRIEF SUMMARY OF THE INVENTION

According to the invention, these aims are achieved by means of, an optical assembly comprising a telecentric lens arranged to be in optical communication with a microlens array.

The optical assembly may further comprise a light source which is in optical communication with the telecentric lens.

The microlens array may comprise semi-cylindrical lenses.

Preferably the microlens array comprises semi-spherical lenses. The microlens array may comprise convex lenses The microlens array may comprise a first array of semi-cylindrical lenses which define a first surface of the microlens array and comprises a second array of semi-cylindrical lenses which define a second surface of the microlens array, wherein the first and second surfaces are opposite one another, and wherein the semi-cylindrical lenses of the first array are orientated perpendicular to the semi-cylindrical lenses of the second array.

The optical assembly further may further comprise a beam combiner which is arranged to receive light from the microlens array.

According to a further aspect of the present invention there is provided an optical assembly comprising, a microlens array, wherein the microlens array comprises a first surface which can receive light and a second surface from which light is emitted, wherein an array of lenslets define the second surface, a pin hole array which arranged adjacent to the second surface of the microlens array. Or, alternatively, according to a further aspect of the present invention there is provided an optical assembly comprising, a microlens array, wherein the microlens array comprises a first surface from which light is emitted, a second surface which can receive light and wherein an array of lenslets define the second surface, a pin hole array which arranged adjacent to the first surface of the microlens array.

The pin hole array may be arranged to abut the second surface of the microlens array.

The pin hole array may be arranged to abut the first surface of the microlens array.

The first surface may be a planar surface.

The pin hole array may be defined by a plate which has a plurality of through holes defined therein, wherein the through-hole define the pin holes which form the pin hole array.

The plate may comprise a film layer. The film layer may be deposited on a surface of the microlens array. The film layer may be patterned after it has been deposited on the microlens array.

The pin hole array maybe located adjacent to the second surface of the microlens array.

The pin hole array maybe located at a distance from the microlens array which is equal to the focal length of the microlens array.

The focal length of any optical component e.g. a lens, microlens array or mirror, is the distance from the optical component where light rays emitted from, or reflected by, the optical component intersect. The focal point is a point where parallel light rays impinging the optical component at normal incidence intersect after transmission/reflection in said optical component.

The pin hole array maybe arrange to abut the first surface of the microlens array.

The pin hole array maybe attached to the first surface of the microlens array.

The microlens array may comprise semi-cylindrical lenses. The microlens array may comprise hemispherical lenses. Preferably the microlens array comprises convex lens. The microlens array may comprise semi-spherical lenses.

The size of the pin holes in the pin hole array may be determined by the spot-size 's' of the light focused by the microlens at the focal point. Preferably the pinhole size is at least as large as the spot size of the light focused by the microlens at the focal point. The spot size s of the focused light focused by the microlens at the focal point is given by $s=1.22 \lambda f/a$, where $\lambda$ is the wavelength of the light, f is the focal length of the microlens and a is half the lateral size of one microlens (e.g. half the diameter (radius) if the microlens is circular).

Typical size of the pin holes may be between 1 to 100 micrometres. The optical assembly may further comprise a telecentric lens arranged such that it can optically communicate with the microlens array.

The optical assembly may further comprise a beam combiner. The beam combiner may arranged to receive light which passes through the pin hole array. The beam combiner may configured to generate a virtual image e.g. for a head up display.

The optical assembly may further comprise a telecentric lens.

In the embodiment which comprises a microlens array which comprises a first surface which can receive light and a second surface from which light is emitted, the optical assembly may further comprise a light source which provides light to the first surface of the microlens array. Or, in the embodiment in which the microlens array comprises a first surface from which light is emitted, a second surface which can receive light the optical assembly may further comprise a light source which provides light to the second surface of the microlens array.

The light source may comprise a MEMS-based projector.

According to a further aspect of the present invention there is provided an optical assembly comprising, a microlens array, wherein the microlens array comprises a first surface which can receive light and a second surface from which light is emitted, wherein an array of lenslets define the second surface, and a Fresnel lens which is arranged adjacent to the first surface such that the Fresnel lens can optically communicate with the first surface of the microlens array.

The Fresnel lens may be arranged to abut the first surface.

The optical assembly may further comprise a light source which is located at a distance from the Fresnel lens which is equal to a focal length of the Fresnel lens.

The optical assembly may further comprise a pin hole array which is located adjacent to the second surface of the microlens array. The pin hole array may be arranged to abut the second surface of the microlens array.

Preferably the pin hole array is arranged between the Fresnel lens and the microlens array.

The optical assembly may further comprise a beam combiner. The beam combiner may arranged to receive light which passes through the pin hole array. The beam combiner may configured to generate a virtual image e.g. for a head up display.

The optical assembly may further comprise a telecentric lens.

The optical assembly may further comprise a light source which provides light to the first surface of the microlens array. The light source may comprise a MEMS-based projector According to a further aspect of the present invention there is provided an optical component comprising an array of micromirrors, wherein each mirror in the array is configured to have a concave surface.

The array of micromirrors may further comprise micromirrors which are configured to have a convex surface.

The optical component may be configured such that the mirrors of the array are located on a planar plane.

The optical component may be configured such that the mirrors of the array are located on a curved plane.

Preferably the dimensions of each micromirror in the array are equal. Preferably the dimensions of each micromirror with a concave surface are equal and the dimensions of each micromirror with a convex surface are equal across the array.

The dimensions of some micromirrors in the micromirror array may be different to the dimensions of other micromirrors in the micromirror array. The dimensions of some of the micromirrors with concave surface in the array may be different to the dimensions of other micromirrors with concave surfaces in the array. The dimensions of some of the micromirrors with convex surfaces in the array may be different to the dimensions of other micromirrors with convex surfaces in the array.

Each of the micromirrors in the array of micromirrors may comprise a bowl-shape profile.

The dimensions of the bowl-shape profile of each micromirror in the micromirror array may be equal.

The dimensions of the bowl-shape profile of some of micromirrors in the micromirror array may be different to the dimensions of the bowl-shape profile of other micromirrors in the micromirror array.

At least some of the micro mirrors comprise concave surfaces which are more concave than the concave surfaces of other micro mirrors in the array.

There is further provided a projection device comprising an one of the above-mentioned optical components.

There is further provided head up display system comprising any one of the above-mentioned optical components.

According to a further aspect of the present invention there is provided an optical assembly comprising a light source, and an optical component according to any one of the above mentioned optical components, wherein the optical component is arranged such that it can receive light from the light source.

The optical assembly may comprise a beam combiner which is arranged such that it can receive light reflected by the optical component.

The optical component may be configured such that the micromirrors of the array are located on a curved plane, and wherein the curvature of the plane is such that chief rays, reflected from the micromirrors in the array, are in parallel.

The optical component may be configured such that the micromirrors of the array are located on a curved plane, and wherein the curvature of the plane is such that all light rays reflected from the micromirrors in the array are directed to the beam combiner.

The micromirrors in the optical component are preferably orientated such that all light which is reflected by the micromirrors of the optical component is received by the beam combiner.

According to a further aspect of the present invention there is provided an optical assembly comprising, a microlens array, wherein the microlens array comprises a first surface which can receive light and a second surface which is opposite to the first surface; wherein a reflective layer is provided on the second surface.

Preferably an array of lenslets define the second surface.

The array of lenslets may comprise convex lenses.

The lenslets in the array are preferably configured to have a concave profile.

According to a further aspect of the present invention there is provided a projection device comprising an optical assembly according to any one of the above-mentioned optical assemblies.

The projection device may comprise a plurality of optical assemblies. The projection device may comprise a beam combiner which is arranged to combine light beams which are output from the plurality of assemblies. Preferably the beam combiner which is arranged to combine light beams which are output from the plurality of assemblies so as to form a virtual image. The virtual image may be one which is visible on a head-up display or a head mounted display.

According to a further aspect of the present invention the is provided a head-up display system comprising one or more of any the above-mentioned optical assemblies.

According to a further aspect of the present invention there is provided an optical assembly comprising, a light source; a micro-mirror matrix; a microlens array or a micromirror array; and a combiner, wherein the micro-mirror matrix is arranged to receive light from the light source and to reflect the light which it receives to a microlens or a micromirror array, and wherein the combiner is arranged to receive light from the microlens or a micromirror array.

Optionally the optical assembly may further comprise a telecentric lens.

Optionally the optical assembly may further comprise any one or more of the features of any of the above-mentioned optical assemblies.

BRIEF DESCRIPTION OF THE DRAWINGS

The invention will be better understood with the aid of the description of embodiments of the invention, given by way of example only and illustrated by the figures, in which:

FIG. 1b illustrates the preferable steps involved in making the microlens array of the optical assembly in FIG. 1a;

FIG. 1c shows a variation of the optical assembly shown in FIG. 1a;

FIG. 3a shows a side view of an optical assembly according to a further aspect of the present invention;

FIG. 3b illustrates the preferable steps involved to provide the pin hole array of the optical assembly in FIG. 3a;

FIG. 4 shows a side view of an optical assembly according to a further aspect of the present invention;

FIG. 5 shows a side view of an optical assembly according to a further aspect of the present invention;

DETAILED DESCRIPTION OF POSSIBLE EMBODIMENTS OF THE INVENTION

Figure 1A:
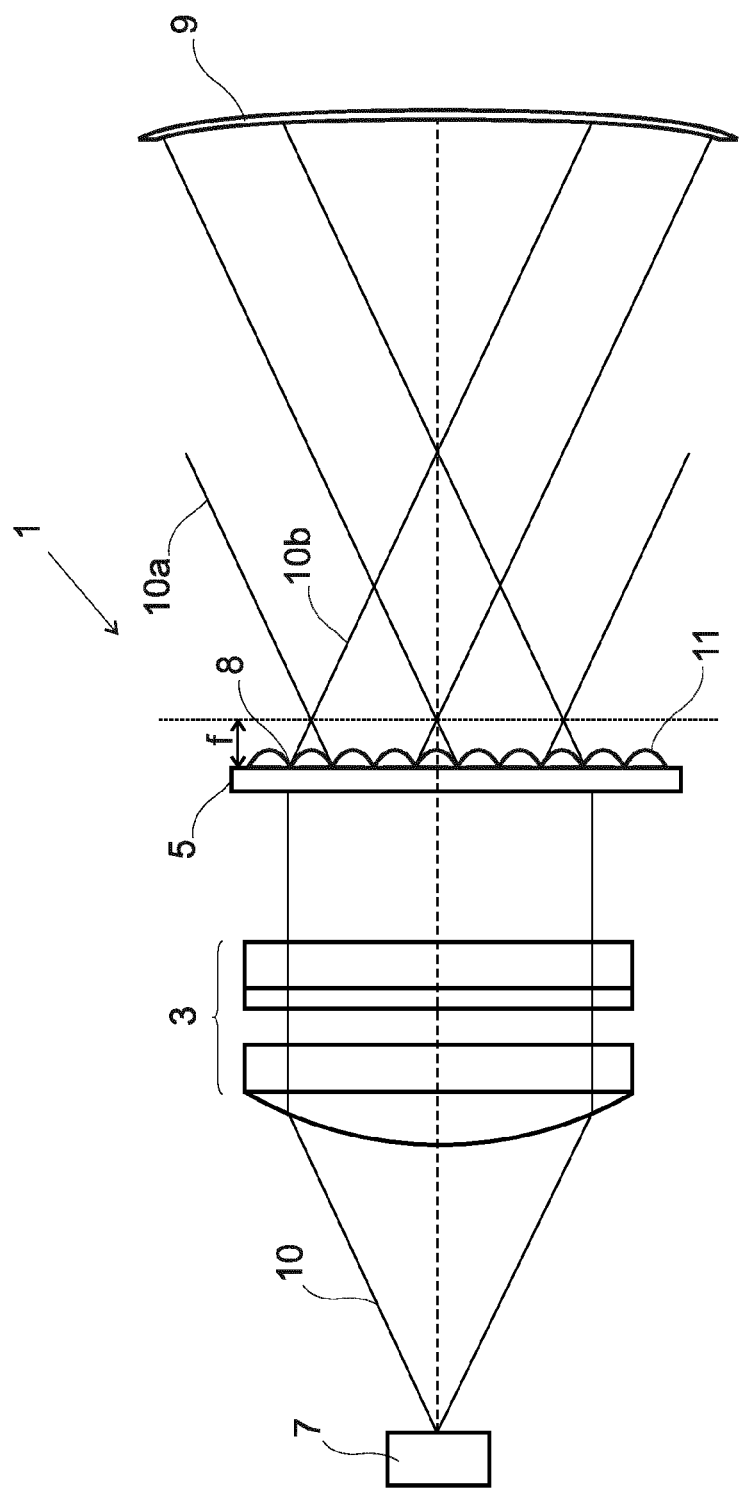
FIG. 1a shows a side view of an optical assembly according to a first aspect of the present invention.

FIG. 1a shows a side view of an optical assembly 1 according to a first aspect of the present invention. The optical assembly 1 comprises a telecentric lens 3 arranged to be in optical communication with a microlens array 5.

The optical assembly 1 further comprises a light source 7 which is in optical communication with the telecentric lens 3. It will be understood that the light source 7 in this embodiment and in all other embodiments described herein may comprise a MEMS based projector i.e. a projector which comprises a MEMS micro mirror which oscillates to scan light. The optical assembly further comprises a beam combiner 9 which is arranged such that it can receive light from the microlens array 5.

The microlens array 5 may take any suitable form. Each lens in the array is known as a lenslet 11. The lenslets 11 may take any suitable form; typically, each lenslets 11 may have a hemispherical shape. Alternatively each lenslet 11 may have a semi-cylindrical or a convex profile. In the exemplary embodiment shown in FIG. 1 the lenslets 11 of microlens array 5 are hemispherical lenses.

During use, light 10 is emitted from the light source 7. The light is passed through the telecentric lens 3 which collimates or focuses the light and outputs this focused or collimated light to the microlens array 5. In the case that the light is collimated, the telecentric lens therefore ensures that all rays incident on the microlens array 5 are parallel to each other and perpendicular to a plane of the microlens array 5; such will ensure that the shape of the projected image is preserved and not deformed. As the light passes through the microlens array 5 each lenslet 11 will cause the light to diverge until a focal distance 'f' from the of the microlens array; after which the light will diffuse. The diffused light will be received by the beam combiner 9. The image projected by the projector may be projected onto the combiner 9, which then may form a virtual image for example for a head-up display. For a virtual image the beam combiner gives the impression to the viewer that the image is projected onto an image plane which is different from the real physical combiner surface, even though the only real physical surface that the light reaches is the combiner surface. In a variation of the embodiment the light may be further reflected by another reflective or semi-reflective surface (for example on the windshield), after the combiner. Unlike the prior art which uses a diffuser to diffuse light, the present invention uses a lens to achieve diffusion; since lenses do not randomises the phase of the light which passes through it, no speckle, or at least less speckle, will be induced.

In projection systems, such as those used in head-up-displays, the 'field-of-view' i.e. the area from which a projected image is visible, is determined by the amount of diffusion of the light. Larger diffusion of light will provide a larger 'field-of-view'. Preferably when the optical assembly 1 is used in a projection system, the lenslets are preferably designed to provide a desired field-of-view.

It should be noted that any suitable manufacturing method may be used to make the microlens array 5 of the optical assembly 1. FIG. 1b illustrates the preferable steps to be taken to manufacture the microlens array 5 of the optical assembly 1 shown in FIG. 1a. The microlens array 5 is made by first providing a transparent substrate (e.g. glass or PMMA or PDMS) (step 1a). A hardenable material such as a curable material (e.g. transparent or non-transparent UV curable epoxy) is deposited over a surface of the transparent substrate (step 1b). The hardenable material is then patterned using a mould and a hot embossing step (step 1c). During the hot embossing step the hardenable material is heated to make it soft and malleable; the mould is then pressed into the hardenable material so that the hardenable material becomes liquid or at least softened to be moulded to the desired shape. Hot embossing is essentially the stamping of a pattern into a polymer softened by raising the temperature of the polymer just above its glass transition temperature. The stamp used to define the pattern in the polymer may be made in a variety of ways including micromachining from silicon, LIGA, and machining using a CNC tool (for making large features). A wide variety of polymers have been successfully hot embossed with micron-scale (and below) size features, including polycarbonate and PMMA. The benefits of this approach are the ability to take advantage of the wide range of properties of polymers, as well as the potential to economically mass produce parts with micron-scale features.

Figure 1C:
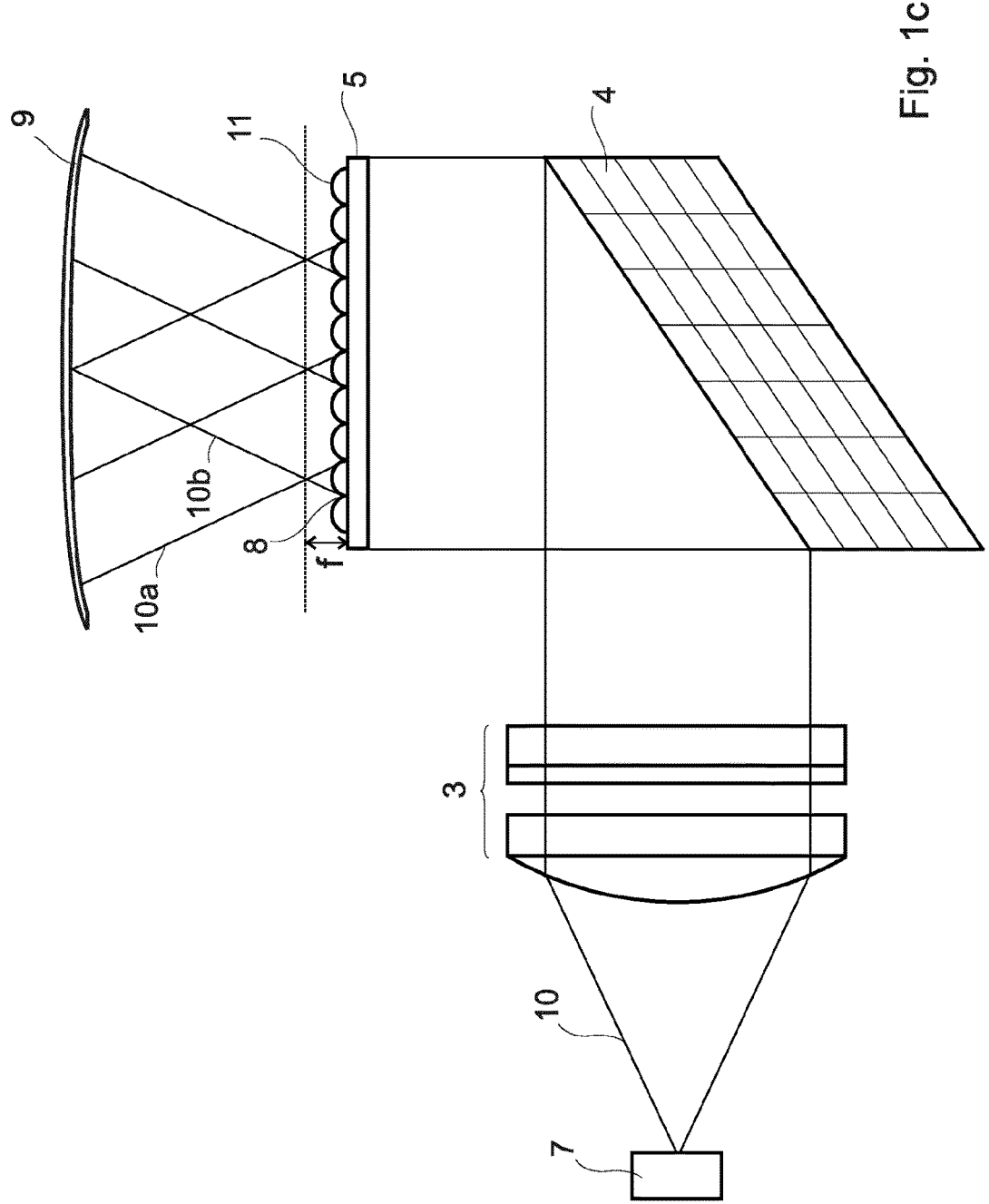

In a variation of the optical assembly 1 of FIG. 1a, there may be further provided a micro-mirror matrix display (i.e.

a DMD chip—Digital Micromirror Display matrix) 4 which is arranged between a telecentric lens (using one or two lenses) or an illumination lens or a condensing lens 3 and the microlens array 5, as is illustrated in FIG. 1c. In other words the micro-mirror matrix 4 (i.e. a micro-mirror matrix is a matrix of MEMS micro mirrors, similar to a DMD chip used in DLP systems) may be arranged to receive light 10 from the lens 3 (it will be understood that the lens 3 may take any suitable form and is not limited to being a telecentric lens) and pass light to the microlens array 5 i.e. the micro-mirror matrix 4 may be arranged in the optical path between the lens 3 and microlens array 5. This variation of the optical assembly 1 may be provided in a head-up display assembly, which comprises LED and/or laser light source 7; wherein the light from the light source passes through the lens 3 to illuminate the micro-mirror matrix 4. The light 10 is reflected by the micro-mirror matrix 4 to the microlens array 5. The light 10 which is reflected by the micro-mirror matrix 4 then passes through the microlens array 5 in case of a transmissive microlens array 5 as shown in FIG. 1c to the combiner 9. It will be understood that the microlens array 5 may alternatively comprise micromirrors i.e. a micromirror array may be provided instead of the microlens array 5, in which case the light 10 received from the micro-mirror matrix 4, alternatively after having passed through a projection lens, would be reflected by the micromirror array to the combiner 9. The microlens or micromirrors of the microlens array 5 or micromirror array respectively may be configured to be concave and/or convex. Light 10 which has been transmitted through or reflected by the microlens array 5 is directed to the combiner 9 (either transmissive or reflective—in case of reflective then the light continues towards the windscreen and is further partially reflected by it), to make a Head-Up Display system. The advantage of such system is that: by placing the microlens array (or micromirror array) after the micro-mirror matrix 4 along the optical path of the light 10, increases the quality of the image which is projected, because the light 10 is diffused by the microlens/micromirror array and as a result the "screen door effect", which is normally visible in the projected image, is removed ("screen door" effect is results from the fact that there is a gap in between two pixels of the micro-mirror matrix 4 and when the light is reflected by the micro-mirror matrix 4 at the gap position there is no reflection; this results in a gap between pixels of a projected image being visible on the projection screen, in the form of black areas/lines/columns). By using the microlens/micromirror array, the light 10 is diffused so that light rays overlap and as a result gap between pixels of the projected image are not visible. If using a classical diffuser to achieve such result, the drawback is that the grains of the diffuser are visible in the image, whereas with microlens/micromirror array, as each lens as an optical performance (low roughness) this roughness is not visible with the eye and therefore not visible in the image.

In a further variation of the optical assembly of FIG. 1c a projection lens may be placed between the micro-mirror matrix 4 and the microlens array 5; in this variation, light will pass from the micro-mirror matrix 4 to the projection lens, and will be directed from the projection lens to the microlens array 5 (or micromirror array). The projection lens will be used to increase the size of the projected image as the distance from the projector to the screen increases.

Disadvantageously, light rays 10a,10b which are received and diffused from the regions 8 which are between the adjacent lenslets 11 in the micromirror array 5 of the optical assembly 1 of FIG. 1a, will provide a dispersed diffusing light beams i.e. many smaller diffusing light beams which propagate in different directions. The regions 8 are sharp troughs. If the optical assembly 1 is used in the projection system, then these dispersed diffusing light beams will decrease the quality of the projected image. A solution to this problem is proposed in the aspect shown in FIG. 3.

Figure 2:
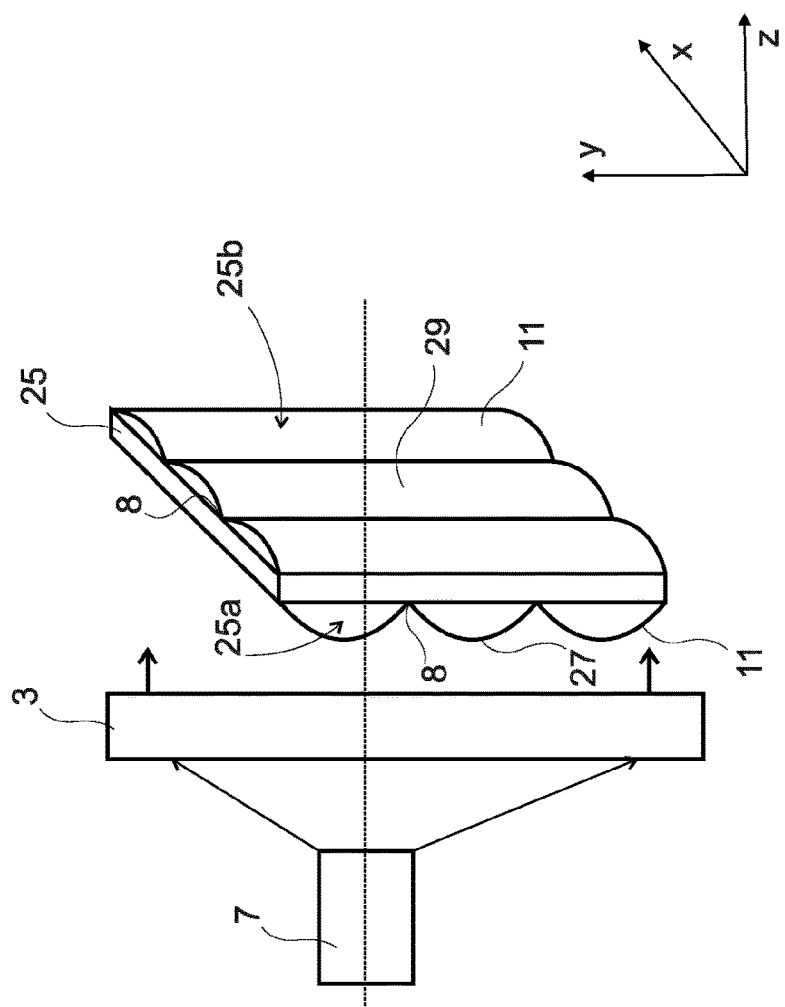
FIG. 2 shows a perspective side view of an optical assembly according to a second embodiment of the present invention.

FIG. 2 provides a perspective view of an optical assembly 20 according to a second embodiment of the present invention. The optical assembly 20 has many of the same features as the optical assembly 1 shown in FIG. 1 and like features are awarded the same reference numbers. In this embodiment the telecentric lens 3 is an optional feature.

The optical assembly 20 comprises a microlens array 25 which comprises a first array 25a of semi-cylindrical lens (lenslets 11) which define a first surface 27 of the microlens array 25 and comprises a second array 25b of semi-cylindrical lenses (lenslets 11) which define a second surface 29 of the microlens array 5. The first and second surfaces 27,29 are opposite one another, and the semi-cylindrical lenses (lenslets 11) of the first array 25a are orientated perpendicular to the semi-cylindrical lenses (lenslets 11) of the second array 25b.

Although it is not illustrated in FIG. 2, the optical assembly 20 could also comprise a beam combiner which is arranged such that it can receive light from the microlens array 25.

The optical assembly 20 operates in the same manner at the optical assembly 1 show in FIG. 1. However, advantageously, the semi-cylindrical lenses (lenslets 11) of the first array 25a and the semi-cylindrical lenses (lenslets 11) of the second array 25b which are orientated perpendicular to one another, enable the independent control of the diffusion of light along the two orthogonal axes e.g. the x and y axis. By configuring the dimensions of the cylindrical lens in each array 25a,b, a user can shape the 'field-of-view'; for example the user may configure the cylindrical lens in each array 25a,b, so that the light which passes through the microlens array 5 will be diffused more along the x axis than along the y-axis; this will result in a rectangular 'field of view'. However the optical assembly 20 suffers from the same disadvantages as those mentioned for the optical assembly 1, with respect to the regions 8 which are between the adjacent lenslets 11.

FIG. 3 shows a side view of an optical assembly 30 according to a further aspect of the present invention.

The optical assembly 30 comprises a microlens array 31. The microlens array 31 comprises a first surface 33 which can receive light and a second surface 35 from which light can be emitted. The first surface 33 is configured to be a planar surface. An array of lenslets 11 defines the second surface 35. Regions 8 exist between the adjacent lenslets 11 in the microlens array 31; regions 8 are sharp troughs. In this particular example the lenslets 11 are hemispherical lenses (as is the case in the microlens array 5 of the optical assembly 1 shown in FIG. 1). However it will be understood that each lenslet 11 could alternatively be a hemispherical lens and/or the lenslets could be provided on both the first and second surfaces 33,35 (as is the case in the microlens array 25 of the optical assembly 20 shown in FIG. 2).

The optical assembly 30 further comprises a pin hole array 37 which arranged adjacent to the second surface 35 of the microlens array 31. The pin hole array 37 is arranged such that the pin holes of the array are aligned with the lenslets 11 of the microlens array 37. The pin hole array 37 comprises an array of through holes 38. The pin hole array 37 is defined by a plate 39 in which a plurality of through-holes 38 are provided. Each of the through-holes 38 preferably have a predefined dimension; preferably each of the through-holes 38 have of equal dimensions; preferably the through-holes 38 are regularly spaced apart.

The pin hole array 37 is located adjacent to the second surface 35 of the microlens array 31 so that the pin hole array 37 can receive light emitted from the second surface 35 of the microlens array 31. The pin hole array 37 is located at a distance 'd' from the microlens array which is equal to a focal length of the microlens array 31. The focal length of the microlens array 31 is the distance from the second surface 35 of microlens array 31 where light rays emitted from a lenslet intersect; this is illustrated in FIG. 3 by means of light rays 32,34, which pass through lenslet 11a and intersect at focal point 'f'; the focal length of the microlens array 31 is the distance from the microlens array 31 to the focal point 'f'.

FIG. 3 also shows the optical assembly 30 further comprising a telecentric lens 3 which is arranged such that it can optically communication with the microlens array 31. It should be understood that the telecentric lens 3 is an optional component. The optical assembly 30 may further optionally comprise a light source (not shown) which is arranged such that it can optically communicate with the telecentric lens.

Figure 3B:
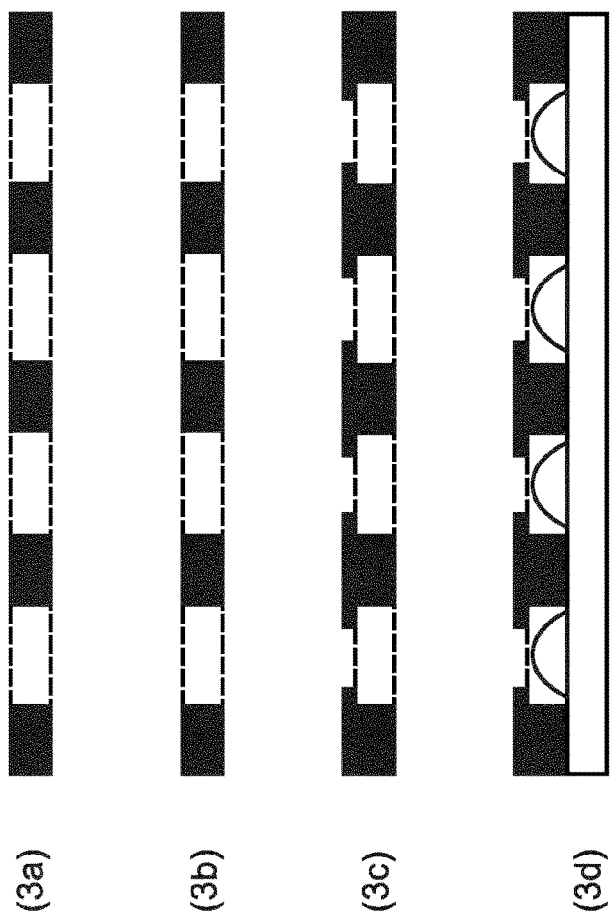

It should be noted that the microlens array 31 of the optical assembly 30 can be made using the steps illustrated in FIG. 1b. FIG. 3b illustrates further steps which may be taken in the manufacture of the optical assembly 30. The manufacture of the optical assembly 30 may further include a step of providing a precursor wafer which is made from non-transparent material and which has a plurality of apertures defined therein (step 3a); the wafer with apertures may be made by embossing or moulding. Alternatively a blank wafer may be providing and a step of providing a plurality of apertures in the wafer may be carried out e.g. by drilling or etching. The apertures in the wafer are then filled with transparent material (e.g. polymer, PMMA and/or PDMS) (step 3b). Semi-transparent or non-transparent material is spun on to a single or two opposing surfaces of the wafer and the semi-transparent or non-transparent material is then patterned so that it has holes at the locations which overlay the apertures in the wafer (step 3c). The semi-transparent or non-transparent material is then patterned by dry or wet etching. The transparent material which fills the apertures in the wafer is then removed and the wafer is attached to the microlens array 31 (step 3d).

Alternatively a molding tool could be used to mould the wafer to into its form illustrated in step 3c of FIG. 3b, by moulding in a non-transparent precursor wafer (e.g. made from UV curing material that has opaque or non-transparent properties).

During use, light from a light source is received by the telecentric lens 3; the telecentric lens 3 in turn outputs light to the optical assembly 30. At the optical assembly the light is diffused in the same manner as discussed with respect to optical assembly 1. Since the pin hole array 37 is located at a distance 'd' from the microlens array which is equal to a focal length of the microlens array 31 light beams which are emitted from the lenslets 11 can pass through the pin holes in the pin hole array 37 i.e. can pass through the through-holes 38 defined in plate 37. However light beams which are received and diffused from the regions 8 which are between the adjacent lenslets 11 in the micromirror array 5, will be blocked by the plate 37. Since the light beams diffused from regions 8 are blocked, this optical assembly 30 does not decrease the quality of the projected image if used in the projection system.

Furthermore the pin hole array 37 also blocks parasitic light which results from ambient light. Ambient light may be incident on the regions 8 and reflected to form parasitic light; this parasitic light can reduce the quality of the projected image if it is reflected form the microlens array 37 to the projection screen. The pin hole array 37 will reduce the amount of parasitic light which is reflected to the projection screen. Additionally when the optical assembly 30 is used in the sun light, sun light is reflected by the microlens array 37 surface making its sub-structure visible and decreasing the contrast. A pinhole array made of light absorbing material, or material which can block light (i.e. material which will not transmit or reflect light) would prevent this occurrence. It will be understood that preferably all the microlens arrays which are mentioned herein may comprise material which has the ability to absorb or reflect light.

However the disadvantage with the optical assembly 30 is that for optimum performance the pin hole array 37 should be located at a distance 'd' from the microlens array which is equal to a focal length of the microlens array 31, otherwise the plate 37 will also block light which is emitted from the lenslets 11 (thus decreasing the brightness of the projected image, when the optical assembly 30 is used in an projection system). It can be difficult to achieve such precise positioning of the pin hole array 37.

FIG. 4 shows a side view of an optical assembly 40 according to a further aspect of the present invention. The optical assembly 40 comprises a microlens array 41. The microlens array 41 comprises a first surface 43 which can receive light and a second surface 45 from which light can be emitted. The second surface 45 is configured to be a planar surface. An array of lenslets 11 defines the first surface 43. In this particular example the lenslets 11 are hemispherical lenses, however it will be understood that each lenslet 11 could alternatively be a hemispherical lenses.

The optical assembly 40 further comprises a pin hole array 37 which has some or all of the same features of the pin hole array 37 used in the optical assembly 30 previously described. Unlike the optical assembly 30, the pin hole array 37 in the optical assembly 40 is however arranged to abut the first surface 43 of the microlens array 41. This is achieved by arranging the plate 39 to abut the second surface 45 of the microlens array 41 so that the pin hole array 47 is located at the second surface 45. Optionally, the plate 39 may be secured or fixed to the first surface 43 of the microlens array 31.

Additionally, the microlens array 41 is configured such that the thickness 't' of the microlens array 41 is equal to the focal length of the microlens array 41. This will mean that light rays 32,34 which are incident on the first surface 43 of the microlens array 31, and which pass through a lenslet 11, will intersect at the second surface 33 of the microlens array 31. Since the light rays will intersect they will be compact enough to pass through the holes in the pin hole array 37. This will enable more light to pass through the through the pin hole array 37; while the pin hole array 37 can function to block light rays diffused by areas of the microlens array 31 which are between the lenslets 11.

Since the microlens array 41 is configured such that the thickness 't' of the microlens array 41 is equal to the focal length of the microlens array 41, the pin hole array 37 can be easily positioned at a distance from the microlens array 41 which is equal to a focal length of the microlens array 41 by simply abutting the pin hole array 37 (i.e. abutting the plate 39 in which the through-hole 38 are defined) to the second surface 45 i.e. the planar surface 37 of the microlens array. The optical assembly 40 can then be used to provide diffusion of light by arranging the optical assembly 40 such that the first surface receives light and the second surface emits light.

It should be understood that for all of the embodiments mentioned herein which use or comprise a pin hole array, the pin hole array is preferably fabricated at wafer level on the same wafer which defines the microlens array so that the alignment between the lenslets of the microlens and the pin holes of the pin hole array can be very well controlled.

The microlens array 41 of the optical assembly 40 can be made using the steps illustrated in FIG. 1*b*. The manufacture of the optical assembly 40 will further including a step of depositing a semi or completely non-transparent material on the surface of the substrate which is opposite to the surface on which the hardenable material is deposited. The semi or completely non-transparent material is then patterned using for example dry or wet etching to define the pin-hole array 37.

FIG. 5 shows a side view of an optical assembly 50 according to a further aspect of the present invention.

The optical assembly 50 comprises a microlens array 31. The microlens array 31 has many of the same features of the microlens array 31 of optical assembly 30, and like features are awarded the same reference numbers.

The optical assembly 50 further comprises a Fresnel lens 51 which is arranged to be in optical communication with the microlens array 31. Preferably the Fresnel lens 51 is configured to abut the first surface 33 of the microlens array 31. The Fresnel lens 51 could optionally be secured to the first surface 33 of the microlens array 31.

The optical assembly 50 further comprises a light source 7. It should be noted that the light source is an optional feature for the optical assembly 50. The light source 7 is arranged in optical communication with the Fresnel lens 51. The light source is located at a distance 'D' from the Fresnel lens 51 which is equal to a focal length of the Fresnel lens. Therefore the Fresnel lens is used in that configuration as a telecentric lens.

The optical assembly 50 is shown in FIG. 5 is shown to further comprise a pin hole array 37. The pin hole array 37 may have some or all of the features, and be arranged and positioned in the same manner, as the pin hole array 37 of the optical assembly 30 shown in FIG. 3. It should be noted that the pin hole array 37 is an optional feature for the optical assembly 50.

The optical assembly 50 can be used in a similar manner as those optical assemblies previously described. Specifically, the optical assembly 50 can receive light from a light source, the optical assembly diffuses the light it receives and may output it to a beam combiner. As with the previous optical assemblies mentioned earlier, the optical assembly 50 can also be used in a projection system, in place of a diffuser, to achieve diffusion of light and a reduction in speckle. Since all of the previously mentioned optical assemblies use lenses to achieve diffusion, they will provide for a reduction in speckle.

In typical projection systems oblique light emitted from the light source is lost, resulting in a decrease in the brightness of pixels at the border of the projected image. Accordingly, the pixels at the center of the projected image will be brighter than the pixels near the border of the projected image providing. However, advantageously in the optical assembly 50, due to the Fresnel lens 51 the optical assembly 50 has the ability to collect more oblique light which is emitted from the light source. Since there is an increase in the amount of oblique light which is collected by the optical assembly 50, if the optical assembly is used in a projection system, it can allow the brightness of a projected image to be more uniform. Since more oblique light is collected the pixels which define the edges of a projected image will be brighter; thus there will be less of a difference in brightness between the pixels at the center of the projected image and the pixels which are at or close to the border of the projected image.

When making the optical assembly 50 steps similar to those illustrated in FIG. 1*b* above are performed to form the microlens array 31; the Fresnel lens may be formed using a suitable mould which will mould hardenable material which is provided on an opposite side of the microlens array 31. Then the steps illustrated in FIG. 3*b* may be carried out to form the pin hole array 37.

Figure 6:
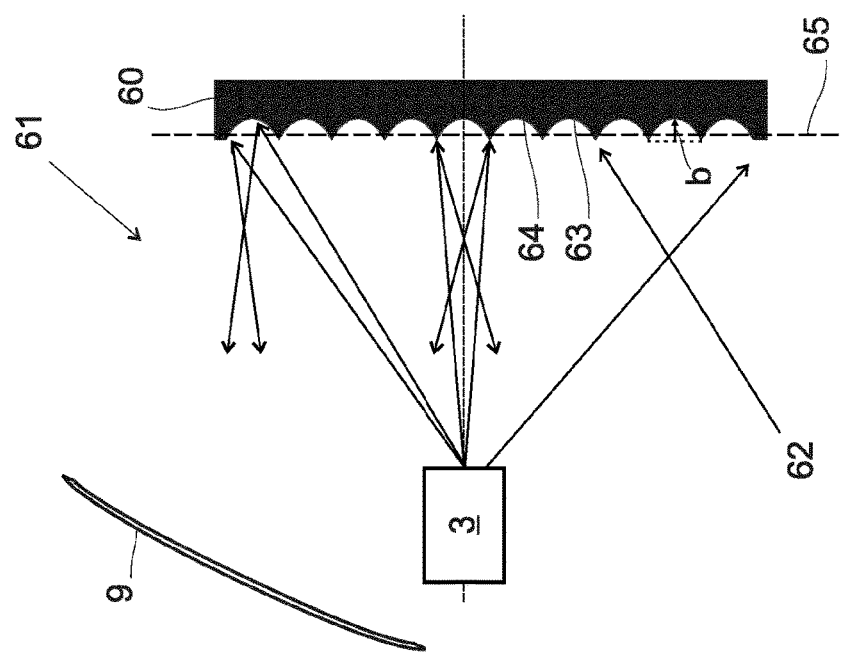
FIG. 6 shows a side view of an optical assembly according to a further aspect of the present invention.

FIG. 6 shows a side view of an optical component 60 according to a further aspect of the present invention, when in use in an optical assembly 61 according to an aspect of the present invention.

The optical component 60 comprises an array of micromirrors 62. Each of the micromirrors 63 in the array is configured to have a concave reflective surface 64. More specifically, in this embodiment, each of the micromirrors 63 in the array 62 is configured to have a bowl-shaped reflective surface 64. The optical component 60 is configured such that all the micromirrors 63 which make up the micromirror array 62, are located on a planar plane 65.

In the optical component 60 the dimensions of each of the micromirrors 63 in the micromirror array 62 are equal. However, alternatively, it will be understood that the dimensions of each of the micromirrors 63 in the micromirror array 62 may vary across the array 62, for example the dimensions of the micromirrors 63 located at an outer perimeter of the micromirror array 62 may be larger than the dimensions of the micromirrors 63 which are located near, or at, the centre of the micromirror array 62. In the optical component 60 the concavity of each of the micromirrors 63 is equal across the array 62. However, alternatively, it will be understood that the concavity of each of the micromirrors 63 could vary across the array 62.

In the optical component 60 the depths 'b' of bowl-shaped reflective surfaces 64 which define each micromirror 63 in the array 62 are equal i.e. each micromirror 63 in the array 62 has the same depth. However it will be understood that the depth of the micromirrors 63 in the array 62 may vary across the array 62. Also in the optical component 60 the dimensions of the bowl-shaped reflective surfaces 64 which define each micromirror 63 are equal across the micromirror array 62. It will be understood that in another embodiment that the dimensions of the bowl-shaped reflective surfaces 64 of the micromirrors 63 in the micromirror array 62 may vary across the micromirror array 62.

The optical component 60 is shown to form a part of an optical assembly 61. The optical assembly further comprises a light source 3 and a beam combiner 9. The optical component 60 is arranged such that it can receive light from the light source 3, and the beam combiner 9 is arranged such that it can receive light which is reflected by the optical component 60.

As with all the previous optical assemblies that optical component can be used in a projection system to reduce speckle. During use the optical component 60 receives light from a light source 3; due to the bowl-shaped profile of the micromirrors 63 in the micromirror array 62 will cause diffusion of the light it receives. Since mirrors do not randomises the phase of the light which they receive no speckle, or at least less speckle, will be induced. Furthermore, in contrast to the microlens arrays used in the previously mentioned assemblies, since the optical component 60 reflects light using the micromirror array 62, rather than transmitting light using lenslets, there is less light loss. More importantly the micromirror array 62 is achromatic, thus all the colors of each light beam which it receives will be diffused (reflected) with the same angle. In contrast, in the microlens arrays, because of the material dispersion (wavelength dependent refractive index) the colors are not diffused with the exact same angle, this can result in a reduction in the resolution of the projected image.

Typically the optical component 60 is required to reflect light it receives from a light source towards a beam combiner, as is the case in the optical assembly 61. In a projection system the light which passes through the beam combiner would then be used to project an image. However, a drawback of the optical component 60 is that much of the light reflected by the optical component 60 is not reflected to the beam combiner. In a projection system this will result in the projected image having decreased brightness.

Figure 7:
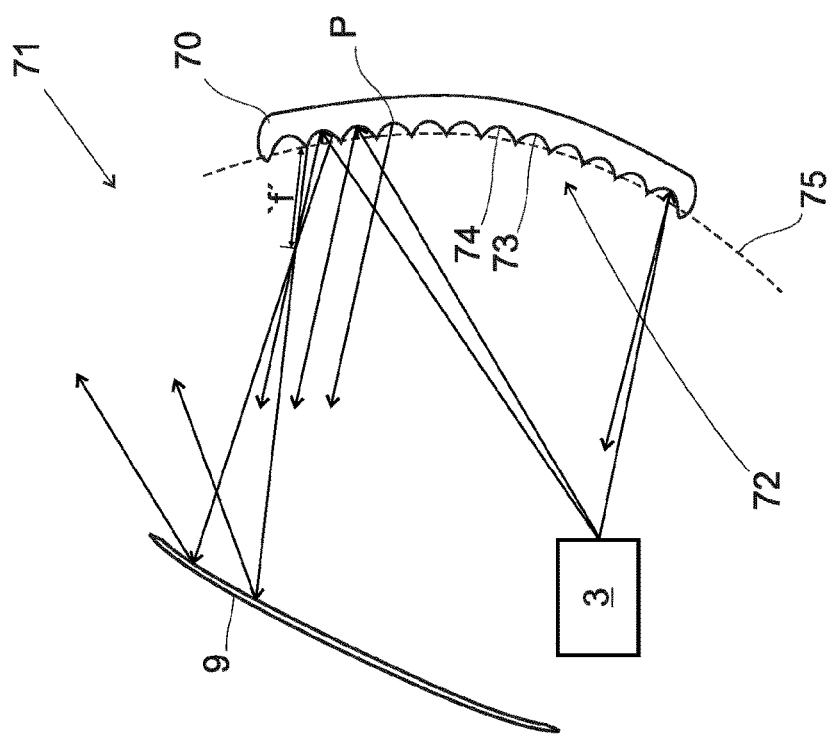
FIG. 7 shows a side view of an optical assembly according to a further aspect of the present invention.

FIG. 7 shows a side view of an optical component 70 according to a further aspect of the present invention, when in use in an optical assembly 71 according to an aspect of the present invention.

The optical component 70 is similar to the optical component 60 shown in FIG. 6 and like features are awarded the same reference numbers. The optical component 70 comprises an array of micromirrors 72. Each of the micromirrors 73 in the array 72 is configured to have a concave reflective surface 74. More specifically, in this embodiment, each of the micromirrors 73 in the array 72 is configured to have a bowl-shaped reflective surface 74.

Unlike the optical component 60, the optical component 70 is configured such that all the micromirrors 73 which make up the micromirror array 62, are located on a curved plane 75. The curvature of the plane 75 is such that chief light rays (i.e. light rays which have been reflected at a centre point 'p' of a micromirror) are in parallel. The centre point 'p' of a micromirror is the centre of a micromirror 73 is the centre point of the bowl-shaped reflective surface 64 which defines that micromirror 73).

In the optical component 70 the dimensions of each of the micromirrors 73 in the micromirror array 72 are equal. However, alternatively, it will be understood that the dimensions of each of the micromirrors 73 in the micromirror array 72 may vary across the array 72, for example the dimensions of the micromirrors 73 located at an outer perimeter of the micromirror array 72 may be larger than the dimensions of the micromirrors 73 which are located near, or at, the centre of the micromirror array 72. In the optical component 70 the concavity of each of the micromirrors 63 is equal across the array 72. However, alternatively, it will be understood that the concavity of each of the micromirrors 73 could vary across the array 72.

In the optical component 70 the depths 'b' of bowl-shaped reflective surfaces 64 which define each micromirror 73 in the array 72 are equal i.e. each micromirror 73 in the array 72 has the same depth. However it will be understood that the depth of the micromirrors 73 in the array 72 may vary across the array 72. Also in the optical component 70 the dimensions of the bowl-shaped reflective surfaces 74 which define each micromirror 73 are equal across the micromirror array 72. It will be understood that in another embodiment that the dimensions of the bowl-shaped reflective surfaces 74 of the micromirrors 73 in the micromirror array 72 may vary across the micromirror array 72.

The focal length 'f' of the micromirror array 62 determines the beam divergence and therefore will determine the field of view if the optical component 60 is to be used in a projection system. For example, a shorter focal length will provide a larger field of view. The dimensions of the bowl-shaped profile of the micromirrors and curvature of the plane 75 can be chosen to provide a desired focal length.

The optical assembly 71 has many of the same features as the optical assembly 60 shown in FIG. 6 and like features are awarded the same reference numbers. The optical assembly 71 operates in the same manner as the optical assembly 60 shown in FIG. 6; however, due to the curvature of the curved plane 75 all chief rays will be reflected by the optical assembly 71 to the beam combiner 9, all the chief rays which will be reflected to the beam combiner 9 are parallel to each other. Thus, in comparison to the optical assembly 61, since all the chief rays are reflected to the beam combiner 9, more light reaches the beam combiner 9 in optical assembly 71. As a result, if the optical assembly 71 is used in a projection system, a brighter projected image can be achieved, an improved brightness uniformity, the aspect ratio of the image is not altered and speckle reduction can all be achieved. Overall the result is that the image is not deformed.

Figure 8:
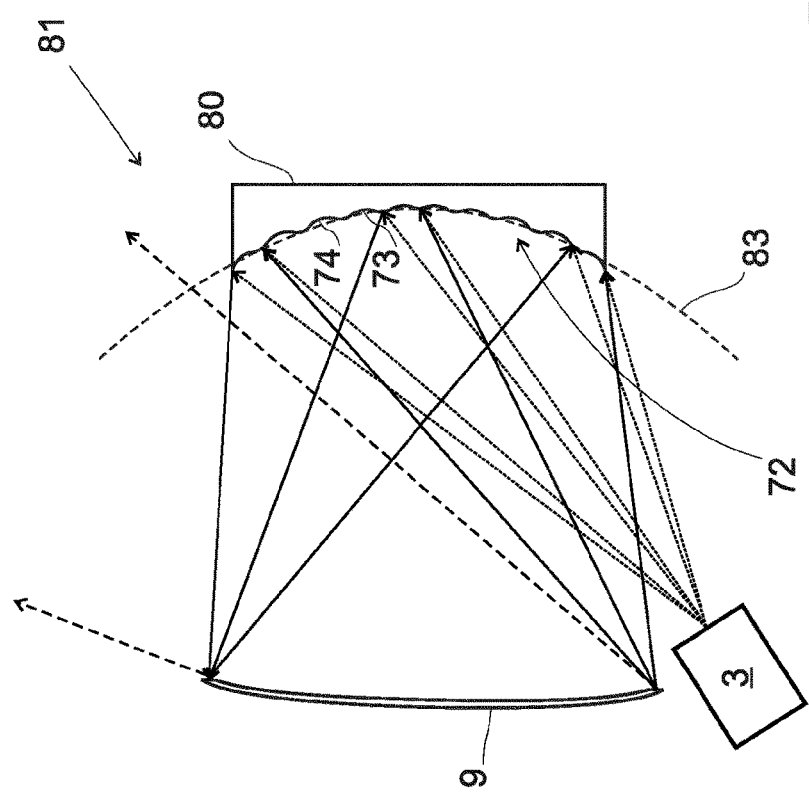
FIG. 8 shows a side view of an optical assembly according to a further embodiment of the present invention.

FIG. 8 shows a side view of an optical component 80 according to a further embodiment of the present invention, when in use in an optical assembly 81. The optical component 80 and optical assembly 81 has many of the same features as the optical component 70 and optical assembly 71 shown in FIG. 7 and like features are awarded the same reference numbers. However, the optical component 80 is configured such that the micromirrors 73 of the array 72 are located on a curved plane 83 which has a curvature which ensures that that all light rays reflected by all the micromirrors 73 in the array 72, will be directed to beam combiner 9

The optical assembly 81 operates in the same fashion as the optical assembly 71, however due to the curvature of the curved plane 83 all light rays reflected by micromirrors 73 in the array 72 will be directed to, and thus received by, the beam combiner 9. As a result, if the optical assembly 81 is used in a projection system, a brighter projected image can be achieved, an improved brightness uniformity and speckle reduction can all be achieved.

In a specific configuration of projection system, the light passes through the microlens array not at the same time (as light is pulsed and a beam deflection mean is use to deflect the beam onto the screen—for ex. a MEMS scanning mirror)

In other specific configuration, the system do not illuminate the entire microlens array at the same time, therefore it reduced the diffractive interference and reduces the optical parasitic, like moiré or other optical effects.

Figure 9:
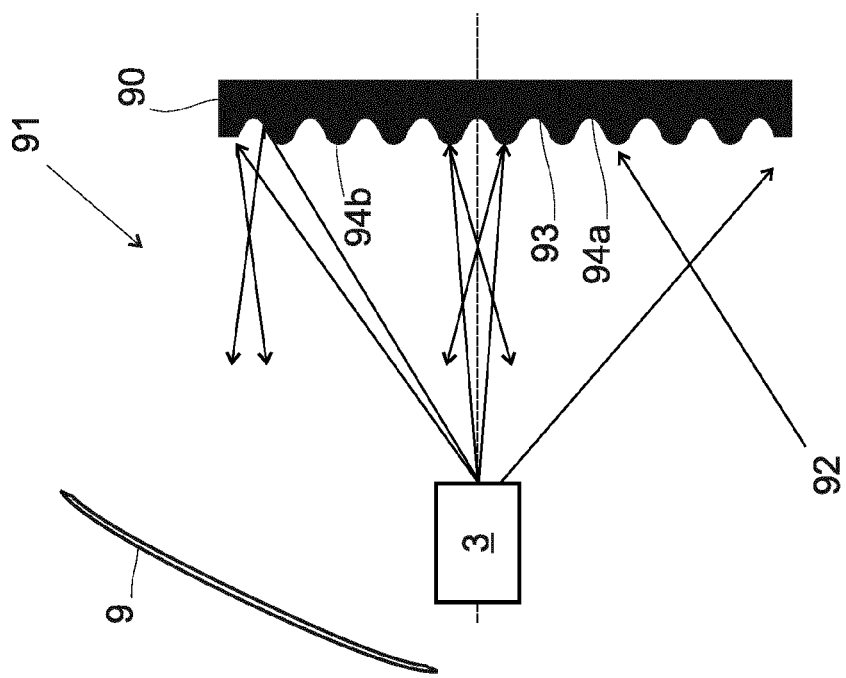
FIG. 9 shows a side view of an optical assembly according to a further embodiment of the present invention.

FIG. 9 shows an optical assembly 91 according to an aspect of the present invention. The optical assembly 91 has many of the same features of optical assembly 61 shown in FIG. 6 and like features are awarded the same reference numbers.

The optical assembly 91 comprises an optical component 90 according to a further aspect of the present invention. As was the case for the optical components in the assemblies shown in FIGS. 6-8 the optical component 90 is also reflective. The optical component 90 comprises an array 92 of micromirrors 93; micromirrors 93 in the array are configured to have a concave reflective surface 94a or a convex reflective surface 94b. Successive micromirrors 93 in the array 92 are configured to have a concave reflective surface 94a and a convex reflective surface 94b; moving horizontally or vertically along the array of micromirrors 93 a micromirror 92 with a concave reflective surface 94a is adjacent to a micromirror 93 with a convex reflective surface 94b etc. Advantageously, micromirrors 93 with a concave reflective surface 94a and micromirrors 92 with a convex reflective surface 94b each provide a different diffraction pattern when they reflect light; accordingly when light beams are reflected by the optical component 91 and directed by the beam combiner 9 to a display surface, less diffraction pattern inhomogeneities or/and less moiré effect will be visible on the displace surface.

Figure 10:
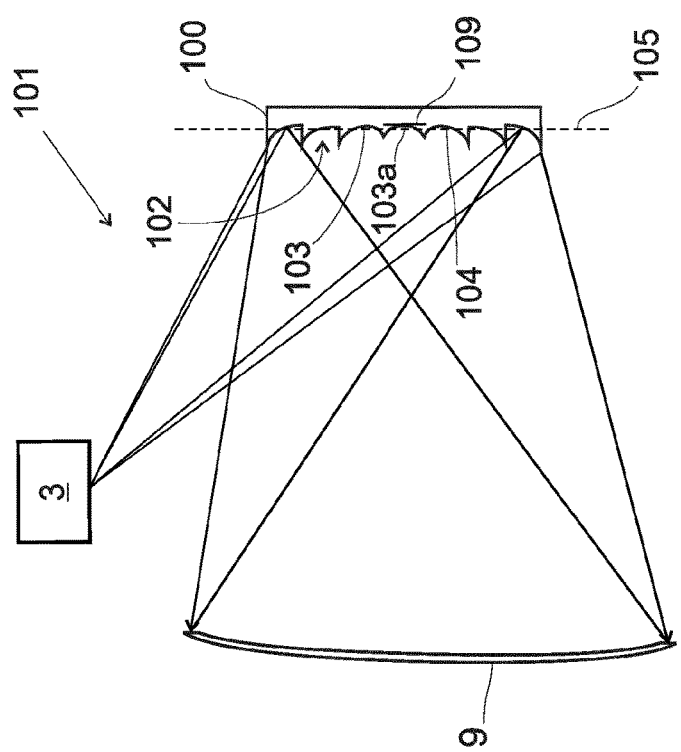
FIG. 10 shows a side view of an optical assembly according to a further embodiment of the present invention.

FIG. 10 shows an optical assembly 101 according to an aspect of the present invention. The optical assembly 101 has many of the same features of optical assembly 61 shown in FIG. 6 and like features are awarded the same reference numbers.

The optical assembly 101 comprises an optical component 100 according to a further aspect of the present invention. The optical component 100 comprises an array 102 of micromirrors 103 which are arranged to lie on the same planar plane 105. Each of the micromirrors 103 in the array 102 is configured to have a concave reflective surface 104; more specifically, in this embodiment, each of the micromirrors 103 in the array 102 is configured to have a bowl-shaped reflective surface 104 (i.e. concave spherical, concave aspherical or concave paraboloid) and they each have substantially the same radius of curvature. Thus the micromirrors 103 in the array 102 have the same shape and dimension. However the orientation of micromirrors 103 is varied across the array 102; specifically the micromirrors 103 are oriented such that all light which is reflected by the micromirrors 103 in the array 102 is received by the beam combiner 9. As can be seen in the figure the micromirror 103a which is located at the centre of the array 102 and is directly opposite the beam combiner 9 is orientated such that a tangent 109 at the centre of the micromirror 103a is parallel to the plane 105. Moving towards periphery of the array 102 the orientation of micromirrors 103 is such that there is an increasing angle between the tangents at the centre of the respective micromirrors 103a and the plane 105.

Advantageously, optical assembly 101 shown in FIG. 10, all light which is reflected by the optical component 100 is received by the beam combiner 9; thus a brighter image can be projected to a display surface. Furthermore there is a reduction in the diffraction pattern effect visible when the light is projected to the display surface as each of the microlens 103 provide a different diffraction pattern due to their differing orientations.

Figure 11:
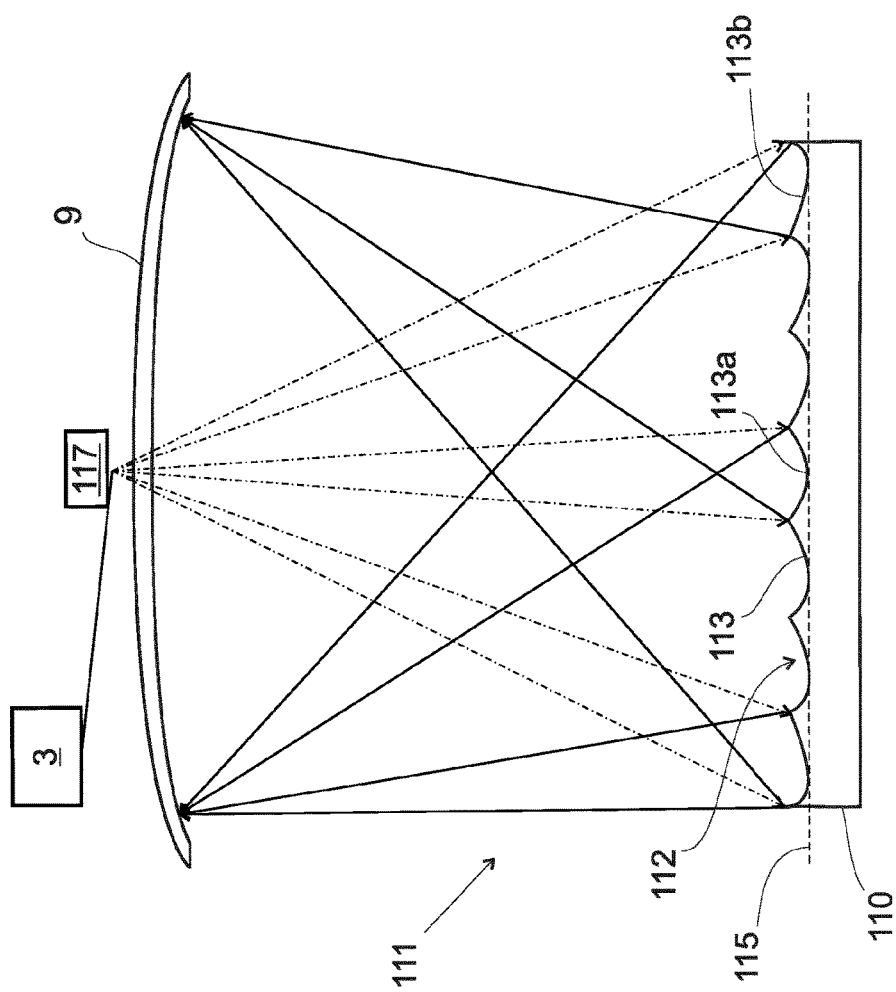
FIG. 11 shows a side view of an optical assembly according to a further embodiment of the present invention.

FIG. 11 shows an optical assembly 111 according to an aspect of the present invention. The optical assembly 111 has many of the same features of optical assembly 61 shown in FIG. 6 and like features are awarded the same reference numbers.

The optical assembly 111 comprises an optical component 110 according to a further aspect of the present invention. The optical assembly 111 is shown to comprise a MEMS mirror device 117 which receives light from a light source 3 and reflects the light it receives to the optical component 110. The optical component 110 comprises an array 112 of micromirrors 113 which are arranged to lie on the same planar plane 115. Unlike the optical component 60 in the optical assembly 61 of FIG. 6, the dimensions of the micromirrors 113 in the micromirror array 112 is not constant across the array 112; in other words the shape of the micromirrors 113 in the micromirror array 112 is not constant across the array 112. The micromirrors 113 in the array 112 are shaped so that all light which is received by the micromirror array 112 is reflected to the beam combiner 9. Specifically the micromirrors 113 in the array 112 are shaped to compensate for the angle at which the light which is reflected from the MEMS device is incident on optical component 110, so all light which is received by the micromirror array 112 is reflected to the beam combiner 9. One example is to use a bowl-shaped reflective surface (i.e. concave spherical, concave aspherical or concave paraboloid) shaped micromirrors 113 of different surface parameters. For instance, in the case of micromirror 113a the most centered micromirror to the combiner 9, the radius of curvature in the center of micromirror 113a is larger that the radius of curvature at the periphery edges of the micromirror 113a. In other words the radius of curvature of micromirror 113a increases moving from the center of the micromirror 113a towards the periphery of the micromirror 113a. The micromirrors which are located at the periphery of the array 112 will have a larger radius of curvature than the radius of curvature of the micromirrors which are located at the centre of the array 112. In other words the radius of curvature of the micromirror 113 increase moving from the center of the array 112 towards the periphery of the array 112.

Advantageously, optical assembly 111 shown in FIG. 11, all light which is reflected by the optical component 110 is received by the beam combiner 9; thus a brighter image can be projected to a display surface; in this particular example, and also optionally in the other embodiment described above, the surface beam combiner 9 is forms the displace surface. Furthermore there is a reduction in the diffraction pattern effect visible when the light is projected to the display surface as each of the microlens 113 provide a different diffraction pattern due to their differing shapes.

Figure 12:
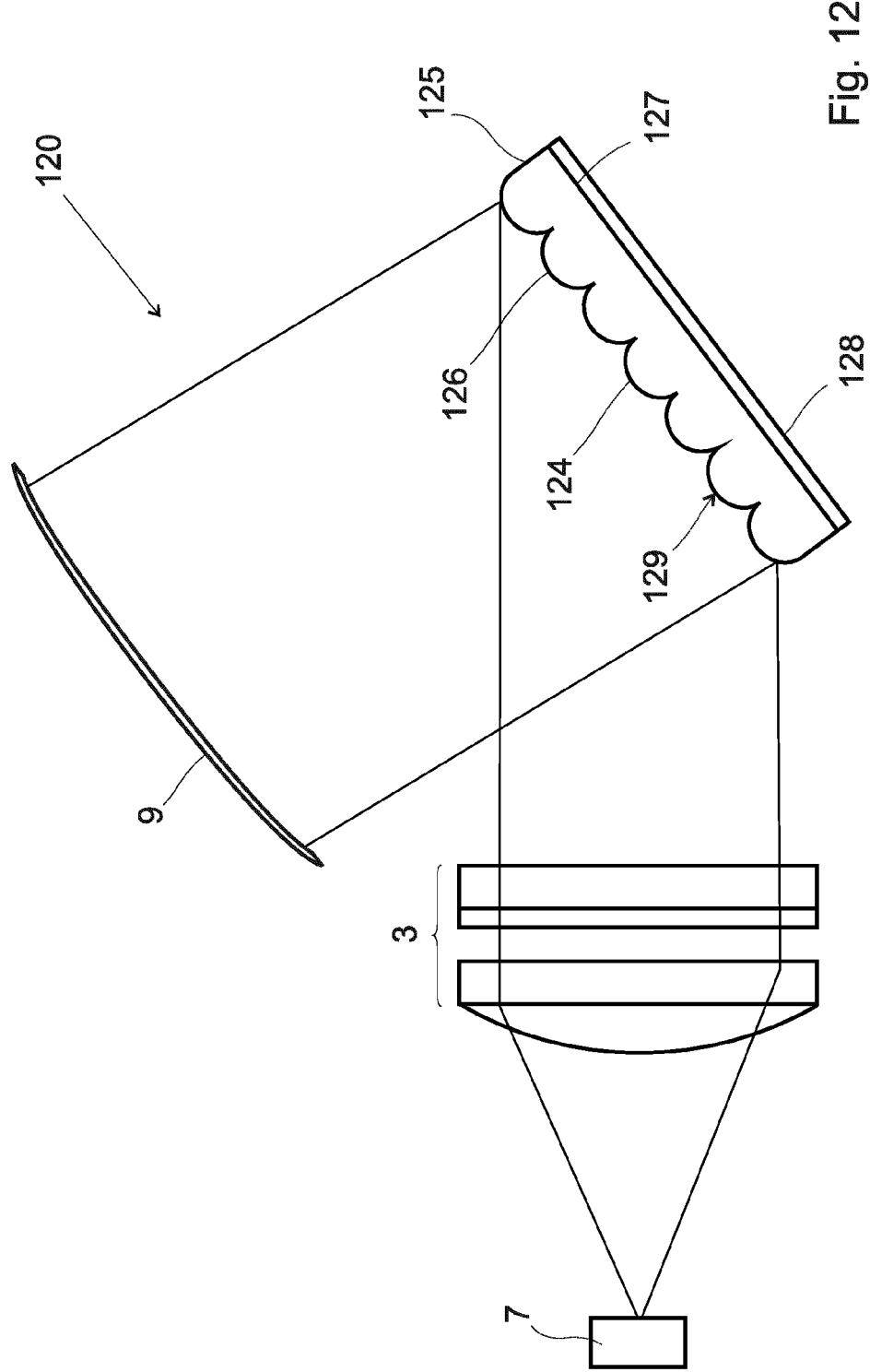
FIG. 12 shows a side view of an optical assembly according to a further embodiment of the present invention.

FIG. 12 shows a side view of an optical assembly 120 according to a further embodiment of the present invention. The optical assembly 120 has many of the same features as the embodiment shown in FIG. 1 and like features are awarded the same reference numbers. The optical assembly 120 comprises a microlens array 125. Unlike the optical assembly 1 shown in FIG. 1 the microlens array 125 in the optical assembly 120 comprises a first surface 126 which can receive light and a second surface 127 which is opposite to the first surface 126. A reflective layer 128 is provided on the second surface 127 and an array of lenslets 129 defines the first surface 126. The array of lenslets 129 comprises convex (for ex. semi-spherical) lenses 124.

Figure 13:
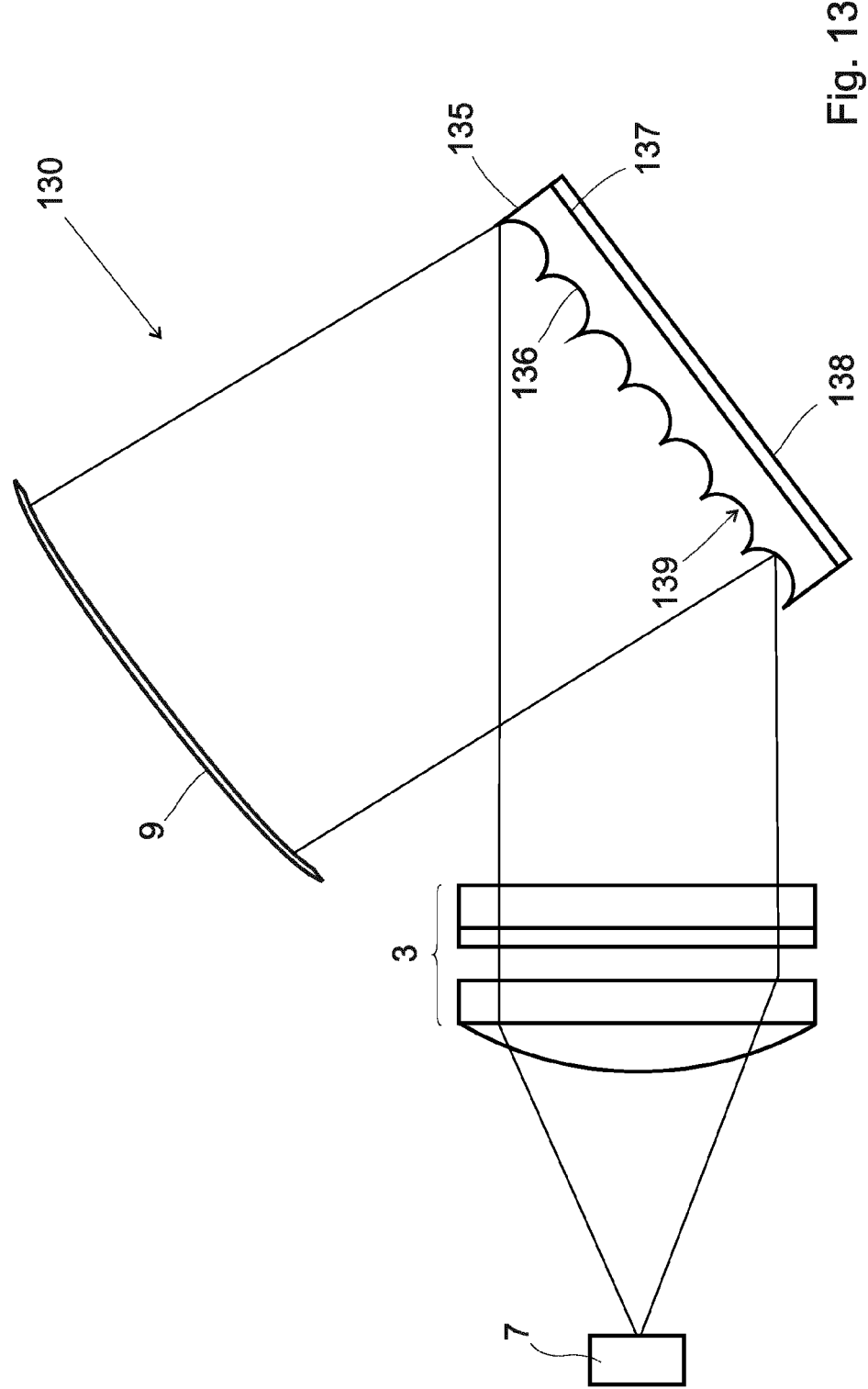
FIG. 13 shows a side view of an optical assembly according to a further embodiment of the present invention.

FIG. 13 shows a side view of an optical assembly 130 according to a further embodiment of the present invention. The optical assembly 130 has many of the same features as the optical assembly 120 shown in FIG. 12 and like features are awarded the same reference numbers. The optical assembly 130 comprises a microlens array 135 which comprises a first surface 136 which can receive light and a second surface 137 which is opposite to the first surface 136. A reflective layer 138 is provided on the second surface 137 and an array of lenslets 139 defines the first surface 136. The lenslets 139 are each configured to have a concave profile.

It will be understood that the embodiments which are shown in FIGS. 12 and 13 may alternatively comprise a microlens array in the form illustrated in FIG. 9 (i.e. with an array with both concave and convex reflective surfaces).

Combine with combiner so as to create a virtual image. All optical systems may be used in HUD or head mounted display Various modifications and variations to the described embodiments of the invention will be apparent to those skilled in the art without departing from the scope of the invention as defined in the appended claims. For example each of the assemblies shown above may comprise a MEMS micro mirror device which comprises a MEMS micro mirror which can oscillate about two or more oscillation axes; the MEMS micro mirror device is preferably arranged in assembly to receive light from the light source 3 before reflecting the light it receives to the microlens array or optical component of the assembly. In each of the optical assembly embodiments described above the MEMS micro mirror device may form part of the light source. The MEMS micro mirror device may be a MEMS-based projector i.e. a projection device which comprises a MEMS micro mirror which can oscillate to scan light across a display screen.

In another variation a plurality of one or more of the above-described optical assemblies may be provided in a single projection assembly; the light beams which are output from each of the optical assemblies may be combined using a combiner; in other words the single projection assembly may comprise a beam combiner which combines the light beams which are output from each of the optical assemblies.

In a further aspect of the present invention there may be provided a head-up display which comprises one or of any of the above-mentioned optical assemblies.

Although the invention has been described in connection with specific preferred embodiments, it should be understood that the invention as claimed should not be unduly limited to such specific embodiment.

The invention claimed is:
1. An optical assembly comprising:
   a microlens array, the microlens array comprising a first surface to receive light and a second surface to emit light;
   a Fresnel lens disposed adjacent to the second surface to optically communicate with the second surface of the microlens array; and
   a pin hole array disposed adjacent to the second surface of the microlens array between the microlens array and the Fresnel lens, the pin hole array disposed a distance from the microlens array substantially equal to the focal length of the microlens array.
2. The optical assembly of claim 1, comprising an array of lenslets defining the first surface.
3. The optical assembly of claim 2, wherein a size of each pin hole of the pin hole array is greater than or equal to a spot size of the light emitted by the microlens array.
4. The optical assembly of claim 3, wherein the size of each pin hole of the pin hole array is between 1 and 100 micrometers.
5. The optical assembly of claim 1, comprising a telecentric lens to optically communicate with the microlens array.
6. The optical assembly of claim 1, wherein the pin hole array comprises light absorbing material.

* * * * *